United States Patent [19]

Yang et al.

[11] Patent Number: 5,243,872
[45] Date of Patent: Sep. 14, 1993

[54] ROBOTIC HAND FOR CONTROLLING MOVEMENT IN MULTIPLE AXES

[75] Inventors: Yoon-Mo Yang, Choongcheongbook-do; Jae-Moon Jeong, Pusan; Seon-Il Kim, Kyungsangnam-do; Ki-Jeon Kim, Kwangju, all of Rep. of Korea

[73] Assignee: Kumho & Co., Inc., Seoul, Rep. of Korea

[21] Appl. No.: 866,631

[22] Filed: Apr. 10, 1992

Related U.S. Application Data

[62] Division of Ser. No. 693,297, Apr. 30, 1991.

[30] Foreign Application Priority Data

| Apr. 30, 1990 | [KR] | Rep. of Korea | 6152/1990 |
| Apr. 30, 1990 | [KR] | Rep. of Korea | 6153/1990 |
| Apr. 30, 1990 | [KR] | Rep. of Korea | 6154/1990 |
| Apr. 30, 1990 | [KR] | Rep. of Korea | 6155/1990 |

[51] Int. Cl.$^5$ ............... G05G 11/00; B25J 18/00
[52] U.S. Cl. ................... 74/479 R; 901/16; 901/23
[58] Field of Search ........ 74/479; 901/14, 15, 901/16, 23, 24, 28, 46, 47

[56] References Cited

U.S. PATENT DOCUMENTS

| 3,727,119 | 4/1973 | Stanley et al. | 901/16 X |
| 4,192,986 | 3/1980 | Udagawa et al. | 901/16 X |
| 4,283,764 | 8/1981 | Crum et al. | 901/46 X |
| 4,585,387 | 4/1986 | Jayne | 901/24 X |
| 4,762,455 | 8/1988 | Coughlan et al. | 901/28 X |
| 4,785,528 | 11/1988 | Soderberg | 74/479 X |
| 4,959,037 | 9/1990 | Garfinkel | 901/15 X |
| 4,964,503 | 10/1990 | Nishiyama et al. | 74/479 X |
| 5,016,489 | 5/1991 | Yoda | 74/479 |

OTHER PUBLICATIONS

Ishimatsu, Kawasue et al., "Real-Time Measurement of Fry in the Cultivation Field Using a Line-Image Sensor," 4 pages.

Li et al., "Subpixel Edge Detection and Estimation with a Line Scan Camera," 1987 IEEE, IECON '87, pp. 667-675.

Ishimatsu, Taguchi et al., "Acquiring 3-Dimensional Data of a Human Face Using a Laser Slit-Ray Projection Method," 6 pages.

*Primary Examiner*—Allan D. Herrmann
*Assistant Examiner*—David W. Laub
*Attorney, Agent, or Firm*—Lowe, Price, LeBlanc & Becker

[57] ABSTRACT

A robotic hand controls movement of a workpiece relative to three longitudinal axes in response to three control signals and relative to mutually perpendicular rotational axes $\alpha$ and $\beta$ in response to two control signals. Two C-shaped holders carry two motors having mutually perpendicular rotating shafts. Each holder includes two parallel flanges connected together by a web. The first motor is mounted on the first holder so its shaft extends between the first holder flanges. A second holder flange is mounted on the first motor shaft between the first holder flanges. The second motor is mounted on the second holder other flange. A carrier for the first holder responds to three of the signals which control movement of the first holder relative to the longitudinal axes.

4 Claims, 2 Drawing Sheets

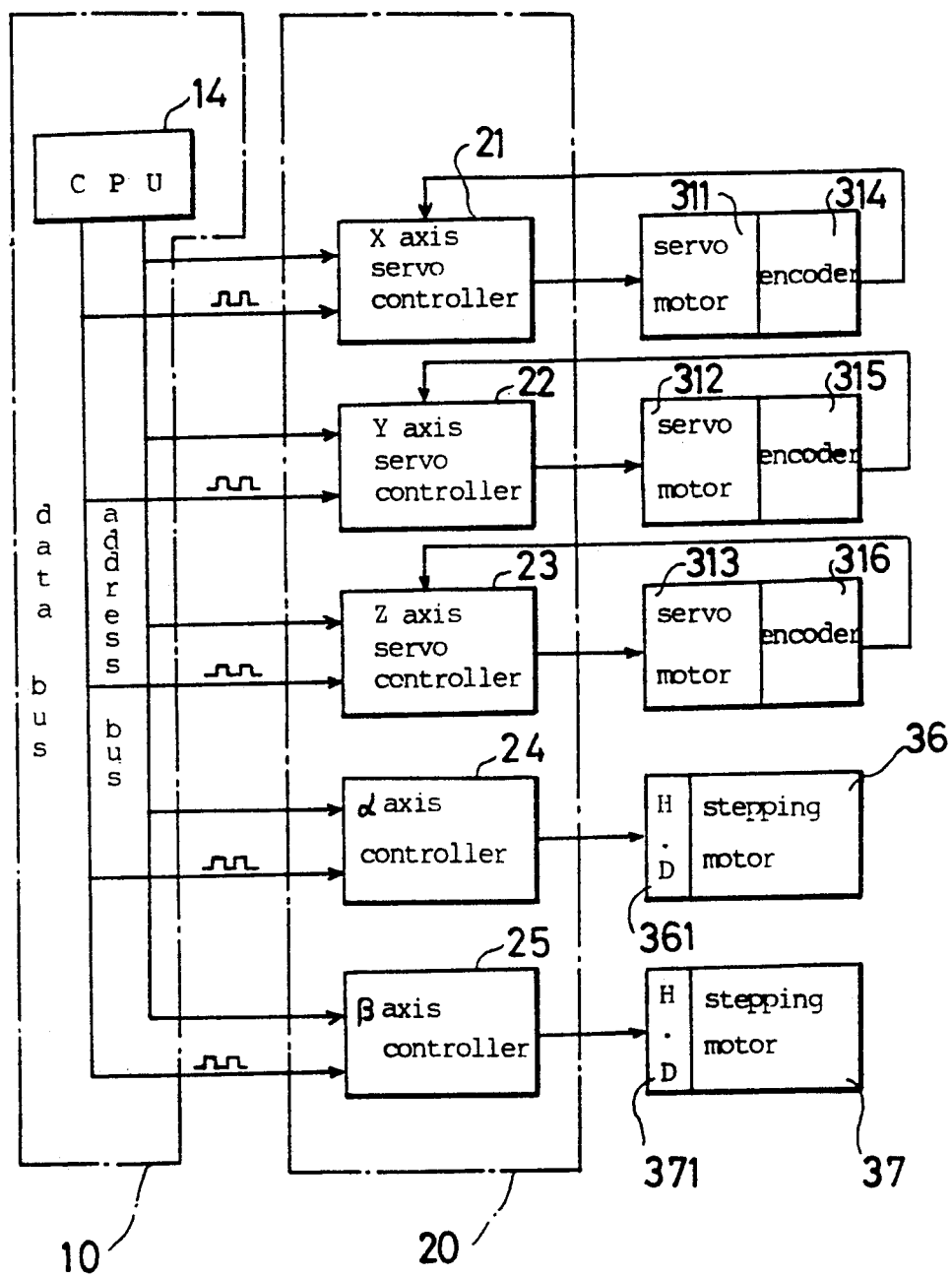

ROBOTIC HAND FOR CONTROLLING MOVEMENT IN MULTIPLE AXES

This application is a division of application Ser. No. 07/693,297 filed Apr. 30, 1991.

BACKGROUND OF THE INVENTION

The present invention relates generally to robotic hands and, more particularly, to a robotic hand including first and second motors having shafts rotatable about mutually perpendicular axes and respectively carried by first and second C-shaped holders.

In general, when a relatively hard solid object is measured with a conventional contact-type shape detective sensor, measurement errors do not occur, However if the object is semi-solid, or if the original shape of the object is deformed by the sensor contacting the object surface, a considerable error results. If the shell profile of a tire having a side wall and tread is measured, the contact-type sensor can not dispense with some error in the measurement itself. Even though the existing non-contact types of measuring apparatus are used to detect 3-dimensional coordinate values, the measurement must be made several times, in tedious repetition by using various implements with the results being compared with each other. Despite these precautions, some errors almost invariably arise.

SUMMARY OF THE INVENTION

A principle object of the present invention is to provide a new and improved 3-dimensional profile measuring apparatus which can notably increase efficiency and accuracy, and to overcome the various problems of prior art profile measuring apparatuses as given above.

Another object of the present invention is to provide a robot hand for said 3-dimensional profile measuring apparatus.

In accordance with the invention, a robotic hand controls movement of a workpiece relative to X, Y and Z mutually perpendicular axes in response to X, Y and Z control signals and relative to mutually perpendicular rotational axes $\alpha$ and $\beta$ in response to $\alpha$ and $\beta$ control signals, the $\alpha$ axis being parallel to the Z axis, the $\beta$ axis being parallel to a plane including the X and Y axes. The hand includes first and second motors respectively having first and second shafts rotatable about the $\alpha$ and $\beta$ axes and respectively responsive to the fourth and fifth signals. First and second C-shaped holders are respectively provided for the first and second motors. The first holder includes first and second parallel flanges extending in mutual parallel planes parallel to the plane of the X-Y axes and connected together by a first web. The second holder includes third and fourth parallel flanges extending in mutual parallel planes parallel to the plane of the X-Y axes. The first motor is mounted on the first holder so the first shaft extends between the first and second flanges. The third flange is fixedly mounted on the first shaft. The second flange is positioned between the third and fourth flanges. The second motor is mounted on the fourth flange. A means carrying the first holder responds to the first, second and third signals for controlling movement of the first holder relative to the X, Y and Z axes.

Preferably, the second motor is mounted on the fourth flange on the same side of the $\alpha$ axis as the first web and the second shaft extends in a direction relative to the $\alpha$ axis that is opposite to the first web.

Other and further objects, features and advantages of the invention will appear more fully from the following detailed description with reference to the accompanying drawings.

BRIEF DESCRIPTION OF THE DRAWINGS

FIG. 2 is a block diagram of the robot hand driver of the present invention.

DESCRIPTION OF A PREFERRED EMBODIMENT

Figure 1:
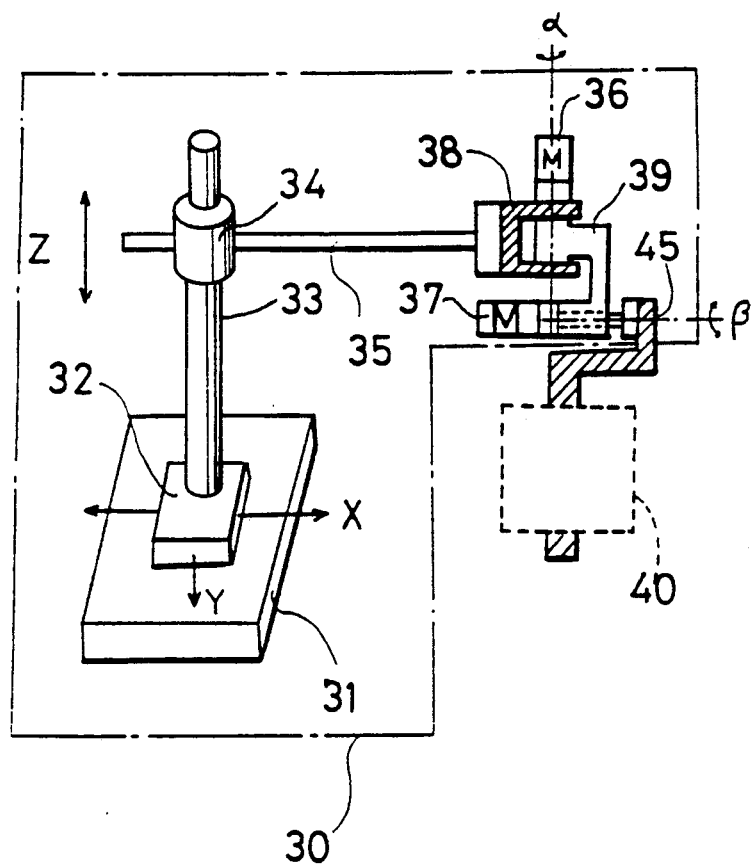
FIG. 1 is a schematic longitudinal sectional view of a multiple-axes-type robotic hand, in accordance with a preferred embodiment of the invention.

A preferred embodiment of the present invention will be described in detail, referring to the accompanying drawings.

As shown in FIG. 1, the robot hand 30 includes a vertically extending pole 33 fixedly mounted on moving plate 32 driven longitudinally along mutually perpendicular X-Y axes in a horizontal plane on base 31. One end of horizontal bar 35 is fixedly mounted on holder 34 that is vertically driven in the Z axis at a right angle to the plane of the X-Y axes. At the end of bar 35 remote from holder 34 is fixedly mounted first C-shaped motor holder 38 having upper and lower horizontally extending flanges connected together by a first web. First stepping motor 36, carried on the upper face of the upper flange of holder 34, includes a vertically extending shaft that rotates about vertical axis $\alpha$ in response to signals from $\alpha$ axis controller 34, FIG. 7. A portion of the shaft of motor 36 extends between facing surfaces of the upper and lower flanges of holder 38 and carries an upper horizontally extending flange of second C-shaped motor holder 39. Holder 39 includes a lower horizontally extending flange on which is fixedly mounted second stepping motor 37 having a horizontally extending output shaft that rotates about horizontal axis $\beta$ and is controlled by controller 25, FIG. 7. The upper and lower flanges of holder 39 are connected together by a second web. The first and second C-shaped holders 38 and 39 and the first and second motors 36 and 37 are arranged so the first motor shaft is between the first and second webs while the second motor shaft extends in an opposite direction relative to axis $\alpha$ from bar 35.

Workpiece or sensor support 45 is fixedly mounted on the end of the shaft of motor 37 slightly outside the second web. Support 45 includes a horizontally extending arm that extends back toward motor 37 underneath the second web and a downwardly depending leg, fixedly mounted on the arm and located between the first and second webs. Workpiece sensor 40 is fixedly mounted on the vertically extending leg. By this mechanism described above, sensor 40 can move with five degrees of freedom, i.e., relative to the X, Y, Z, $\alpha$ and $\beta$ axes. Apparatus for controlling the robotic hand of FIG. 1 is illustrated in FIG. 2 as including servomotors 311, 312 and 313 for respectively controlling movement of plate 32 relative to the X and Y axes and movement of bar 35 along the Z axis. Encoders 314, 315 and 316, respectively coupled to the shafts of motors 311, 312 and 313, are mounted on base 31 inside robotic hand 30. Controllers 21, 22 and 23, respectively connected to servomotors 311, 312 and 313, respond to signals from encoders 314, 315 and 316 and address and data signals from CPU 14 to control the positions of the shafts of motors 311, 312 and 313. CPU 14 supplies address and data signals to $\alpha$ and $\beta$ controllers 24 and 25 which in turn respectively control stepping motors 36 and 37. Controllers 21–25 are placed inside the robot driver 20.

It is to be understood that this description is intended as illustrative, rather than exhaustive, of the invention. Persons of ordinary skill in the relevant art may make certain additions to, deletions from, or changes in the embodiments described in this disclosure without departing from the spirit or the scope of the invention, as set forth in the appended claims.

What is claimed is:

1. A robotic hand for controlling movement of a workpiece relative to multiple axes, said robotic hand comprising:

a vertical pole on a plate movable in X and Y axial directions in a horizontal plane;

a horizontal bar mounted on and extending at a right angle from said vertical pole to be movable in a Z axis direction that is at a right angle to the horizontal plane, the horizontal bar fixedly carrying a first C-shaped motor holder on one end thereof, the first holder including upper and lower horizontal flanges connected together by a first web;

a first stepping motor having a first rotatable output shaft controlled by an $\alpha$ axis controller, the first motor being carried by the upper flange of the first motor holder so the first output shaft rotates about an axis extending parallel to the vertical pole between surfaces of the upper and lower flanges of the first holder;

a second stepping motor having a second rotatable output shaft controlled by a $\beta$ axis controller;

a second c-shaped motor holder having upper and lower horizontal flanges connected together by a second web, the upper flange of the second motor holder being fixedly mounted on the first shaft between the upper and lower flanges of the first holder, the first shaft being disposed between the first and second webs, the second motor being mounted on the lower flange of the second motor holder so the second shaft rotates about an axis extending parallel to the horizontal bar; and a support fixed on one end of a shaft of the second stepping motor for carrying the workpiece.

2. The robotic hand of claim 1 in combination with a control system therefor, the control system including:

first, second and third servomotors having output shafts for respectively controlling movement of the plate and bar in the X, Y and Z axes, and first and second controllers for respectively controlling the rotational positions of the first and second shafts of the first and second stepping motors relative to the $\alpha$ and $\beta$ axes.

3. A robotic hand for controlling movement of a workpiece relative to X, Y and Z mutually perpendicular axes in response to X, Y and Z control signals and relative to mutually perpendicular rotational axes $\alpha$ and $\beta$ in response to $\alpha$ and $\beta$ control signals, the $\alpha$ axis being parallel to the Z axis, the $\beta$ axis being parallel to a plane including the X and Y axes, the hand comprising first and second motors respectively having first and second shafts rotatable about the $\alpha$ and $\beta$ axes and being respectively responsive to the fourth and fifth signals;

first and second C-shaped holders for the first and second motors, respectively; the first holder including first and second parallel flanges extending in mutual parallel planes parallel to the plane of the X-Y axes, and connected together by a first web; the second holder including third and fourth parallel flanges extending in mutual parallel planes parallel to the plane of the X-Y axes; the first motor being mounted on the first holder so the first shaft extends between the first and second flanges, the third flange being fixedly mounted on the first shaft between the first and second flanges, the second flange being positioned between the third and fourth flanges, the second motor being mounted on the fourth flange; and means carrying the first holder and responsive to the first, second and third signals for controlling movement of the first holder relative to the X, Y and Z axes.

4. The robotic hand of claim 3 wherein the second motor is mounted on the fourth flange on the same side of the $\alpha$ axis as the first web and the second shaft extends in a direction relative to the $\alpha$ axis that is opposite to the first web.

* * * * *